T. G. Springer,
Manf. Gas.
No. 109,264. Patented Nov. 15, 1870.
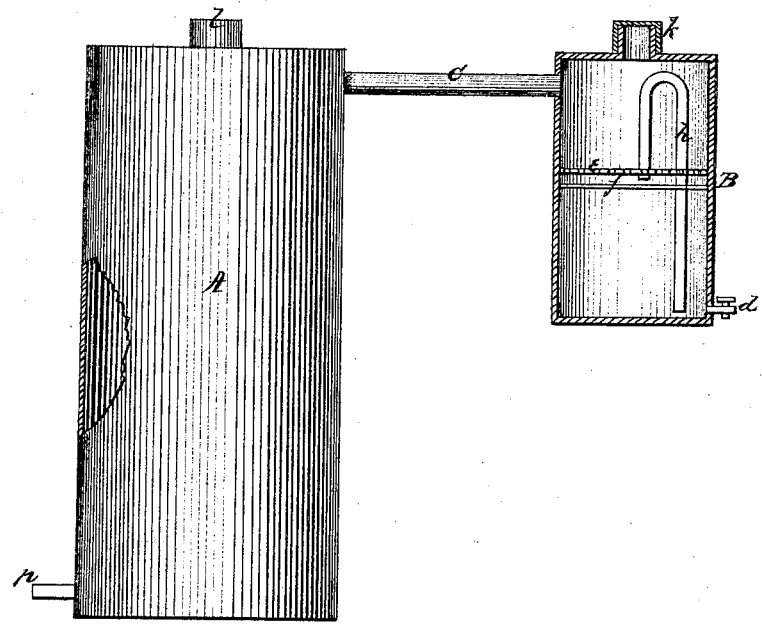
Witnesses
Inventor
Theodore G. Springer,
per Alexander Mason
Attys.

United States Patent Office.

THEODORE G. SPRINGER, OF ST. LOUIS, MISSOURI.

Letters Patent No. 109,264, dated November 15, 1870; antedated November 3, 1870.

IMPROVEMENT IN FEEDING HYDROCARBON LIQUIDS TO A HOT-GAS RETORT.

The Schedule referred to in these Letters Patent and making part of the same.

*To all whom it may concern:*

Be it known that I, THEODORE G. SPRINGER, of St. Louis, in the county of St. Louis and in the State of Missouri, have invented certain new and useful Improvements in Feeding Hydrocarbon Liquids to a Hot Retort; and do hereby declare that the following is a full, clear, and exact description thereof, reference being had to the accompanying drawing and to the letters of reference marked thereon making a part of this specification.

The nature of my invention consists in the construction of an apparatus for, and method of producing pressure upon, hydrocarbon fluids in such a manner that, while the fluids from a tank containing them are discharged from the bottom to a hot retort for the production of illuminating gas, gas is automatically forming in the pressure apparatus to compensate for the loss of pressure sustained upon the hydrocarbon fluids, thus maintaining a uniform pressure on such fluids till every drop from the tank has been discharged.

The advantages of producing pressure by automatically forming gases will be very evident by comparison.

When pressure is produced by simply pumping air or any other elastic fluid upon hydrocarbon liquids, for the purpose above specified, it is—

First, necessary that the tank containing the liquid should be of sufficient capacity to hold, aside from the liquid, a large quantity of compressed air.

Second, that the tank should be very strong, because, if it should be necessary to use at least fifteen pounds of pressure as the minimum, in order to sustain this pressure till the last of the liquid is discharged, a quantity of air equal in bulk to the liquid in the tank should be confined in the same tank under a pressure of thirty pounds when the process of discharging the liquid commences.

Third, when an apparatus is started with a pressure of thirty pounds, it is impossible to maintain the uniform pressure upon the lights while the said pressure is gradually running down to fifteen pounds.

Fourth, high and unnecessary pressure produce greater strain upon the apparatus.

By my process of producing pressure automatically by elastic fluids I have many advantages:

First, I fill the hydrocarbon tank entirely full with the fluid, saving the bulk of the tank.

Second, instead of making a two-barrel tank of a strength to hold thirty pounds' pressure, I can use a one-barrel tank strong enough to hold fifteen pounds' pressure to answer my purpose, saving half the cost.

Third, pumping elastic fluids up to a pressure of thirty pounds requires more labor than to prepare my apparatus for the generation of gases.

Fourth, while by the method of pumping elastic fluids up to thirty pounds and letting the pressure run down to fifteen pounds the lights must necessarily diminish with the pressure of the fluid upon the liquid, my lights continue of the same strength, because, as the fluid in my tank is used up, an elastic fluid of uniform density is proportionately manufactured in my pressure apparatus to compensate for any expenditure of the fluid in the hydrocarbon tank.

In order to enable others skilled in the art to which my invention appertains to make and use the same, I will now proceed to describe its construction and operation, referring to the annexed drawing, which represents a side view of the tank containing the hydrocarbon liquid with a vertical section of the pressure apparatus.

A represents the hydrocarbon-fluid tank, filled most entirely with such fluid.

B represents the pressure-vessel, connected at its top by a tube, $c$, to the tank A.

The pressure apparatus is divided into two compartments by the diaphragm $f$. Above the partition $f$, about one-half inch, is placed a perforated plate, $e$, upon which is placed the material chosen to be acted upon by any acid or other chemical liquid for the production of gases. This substance may be zinc, iron shavings, &c.

$h$ is a siphon extending from one-quarter inch of the partition $f$, in the upper chamber, up to its top, then down through said partition into the chamber below, and to within one-quarter inch from its bottom, being made tight where it penetrates through the partition $f$.

$l$ is a hole, provided with a cap, upon the top of the hydrocarbon-tank, and $n$ is the communication between the hydrocarbon-tank and the retort of any gas apparatus.

$d$ is a stop-cock at the lower part of the pressure apparatus, and $k$ is a hole through the top of said apparatus.

The operation is as follows:

Introduce through the hole $k$ a sufficient quantity of zinc or iron shavings, fill the hydrocarbon-tank with the liquid, and close it air-tight at $l$. Now fill the upper part of the pressure apparatus B entirely with diluted sulphuric acid, and close the hole $k$ and all the stop-cocks. At once a quantity of gas will be generated on the top of the liquid in the pressure apparatus, and, the pressure apparatus communicating with the hydrocarbon-tank by means of the tube $c$, such pressure will act with equal force upon the liquid in the hydrocarbon-tank A. Immediately upon such pressure being exerted upon the fluid in the pressure-tank, and as such pressure increases, the diluted acid will gradually be displaced, through the siphon $h$, from the upper part of the pressure apparatus to its lower chamber, till all such liquid is displaced from the material on the perforated plate e, when the generation of gas must necessarily cease.

It must here be remarked that the lower chamber in the pressure apparatus should be of twice the capacity of the upper.

Now, as the diluted acid in the upper chamber did fill the entire space of it, and said acid has been transferred to the lower chamber against confined air, and as the space in the lower chamber is twice that of the upper, the diluted acid must now fill half the space in the lower chamber, having compressed the air to half its bulk, which establishes a pressure of fifteen pounds all through the pressure-tank and hydrocarbon-vessel. The diluted acid being removed from the substance on the perforated plate in the upper chamber, no more gas can be generated, and, consequently, the pressure not increased beyond fifteen pounds, unless otherwise provided for.

While the hydrocarbon liquid in tank A is gradually being used up for the production of gas, the pressure on the top of said liquid would gradually diminish, as it does in cases where compressed air is used; but instantly a new quantity of the diluted acid is forced from the lower chamber of the pressure apparatus to the upper, when it again comes in contact with the iron or zinc, to create a new quantity of gas to keep up the equal pressure of fifteen pounds till all the liquid from the hydrocarbon-tank has been exhausted.

The pressure can be made less by starting the process with less diluted acid in the upper chamber, consequently compressing the air less in proportion. Or it can be increased by having the lower part partially filled with diluted acid in addition to the liquid above.

I do not confine myself to the production of any peculiar kind of gas, but embrace all such as can be practically made use of for my purpose—such as are produced by the action of different acids on metals or compounds of lime and carbonic acid, viz., iron, zinc, tin, marble, chalk, &c.

Having thus fully described my invention,

What I claim as new, and desire to secure by Letters Patent, is—

1. Producing an equal or uniform pressure upon hydrocarbon liquids contained in a tank or vessel by the generating of gas, by the action of acids upon suitable material, in proportion as the hydrocarbon liquids are consumed, for the purpose of making illuminating gas, substantially as set forth.

2. The combination of the hydrocarbon-tank with the pressure apparatus in which gases are generated by the action of acids upon suitable material, for the purpose of feeding hydrocarbon liquids to a hot retort, substantially as set forth.

In testimony that I claim the foregoing, I have hereunto set my hand this 6th day of April, 1870.

THEODORE G. SPRINGER.

Witnesses:
WM. McC. JONES,
C. L. EVERT.